United States Patent
McCombe et al.

(10) Patent No.: US 7,603,448 B2
(45) Date of Patent: Oct. 13, 2009

(54) SYSTEM AND METHOD FOR MANAGING CLIENT PROCESSES

(75) Inventors: Kevin McCombe, Ottawa (CA); Remi Côté, Hull (CA)

(73) Assignee: Wind River Systems, Inc., Alameda, CA (US)

( * ) Notice: Subject to any disclaimer, the term of this patent is extended or adjusted under 35 U.S.C. 154(b) by 2127 days.

(21) Appl. No.: 09/738,786

(22) Filed: Dec. 15, 2000

(65) Prior Publication Data

US 2002/0078189 A1    Jun. 20, 2002

(51) Int. Cl.
G06F 15/173 (2006.01)
G06F 15/16 (2006.01)

(52) U.S. Cl. .............. 709/223; 709/201; 709/203; 718/100; 718/103

(58) Field of Classification Search ......... 709/200–203, 709/206–208, 223–224, 217–219; 718/100, 718/102–104, 106–107
See application file for complete search history.

(56) References Cited

U.S. PATENT DOCUMENTS

| | | | |
|---|---|---|---|
| 5,606,659 A | 2/1997 | Målöy | 714/25 |
| 5,801,690 A * | 9/1998 | Ayoub et al. | 718/106 |
| 5,913,060 A | 6/1999 | Discavage | 719/310 |
| 5,937,187 A | 8/1999 | Kosche et al. | 718/104 |
| 6,026,424 A * | 2/2000 | Circenis | 718/104 |
| 6,385,637 B1 * | 5/2002 | Peters et al. | 718/107 |
| 6,389,447 B1 * | 5/2002 | Singh | 718/100 |
| 6,418,462 B1 * | 7/2002 | Xu | 709/201 |
| 6,463,457 B1 * | 10/2002 | Armentrout et al. | 709/201 |
| 6,470,346 B2 * | 10/2002 | Morwood | 709/203 |
| 6,769,019 B2 * | 7/2004 | Ferguson | 709/219 |
| 6,888,477 B2 * | 5/2005 | Lai et al. | 709/203 |
| 7,519,665 B1 * | 4/2009 | Shimada et al. | 709/206 |

FOREIGN PATENT DOCUMENTS

| | | |
|---|---|---|
| EP | 0 727 742 | 8/1996 |
| EP | 0727742 A2 | 8/1996 |
| EP | 0 834 806 | 4/1998 |
| EP | 0834806 A2 | 4/1998 |
| EP | 0 959 406 | 11/1999 |
| EP | 0959406 A2 | 11/1999 |

* cited by examiner

*Primary Examiner*—Bharat N Barot
(74) *Attorney, Agent, or Firm*—Fay Kaplun & Marcin, LLP

(57) ABSTRACT

A system for managing a plurality of client processes, comprising a client task within which the client processes will be executed and a manager task running at a higher priority than the client task, the manager task queuing the client processes into the client task in priority order, wherein the manager task kills the client task when a current one of the client processes is not completed within a predetermined time period.

11 Claims, 5 Drawing Sheets

Client Task 400

SYSTEM AND METHOD FOR MANAGING CLIENT PROCESSES

BACKGROUND INFORMATION

Computer hardware and software have been developed with the ability to multitask to increase the effectiveness and efficiency of work that is performed on computing devices, for example, personal computers ("PCs") or servers. Such multitasking may be carried out by a single processor in a single PC, where the single processor simultaneously executes instructions from multiple software programs. For example, a user of the PC may open a software program for the rendering of a drawing. While the software program is rendering the drawing, the user may have also opened a word processing program and started to type into a document. The processor of the PC may switch from processing the keystrokes of the word processing program to the rendering of the drawing in the intervals between keystrokes. Even though these intervals are quite short in terms of human time, these intervals may be quite lengthy for the processor of the PC. Thus, intervals during the execution of a primary operation such as these may be used to accomplish a secondary purpose, e.g., rendering the drawing. This is a very simple example of multitasking and the hardware and software mechanisms to implement a multitasking scheme for such a simple example may be very complex, requiring steps such as the prioritizing of tasks and the allocation of processor resources.

More complex examples of multitasking arise in situations where there is a computer network arranged in a client-server relationship. For example, the server may have multiple processors with each processor processing separate tasks while receiving requests from clients on the network. The clients may be, for example, PCs, printers, modems, etc, which require services from one of the server processors in order to run various tasks. In this type of environment, hundreds of clients may be simultaneously requesting services from the server. A process for implementing multitasking in such an environment must be extremely complicated to efficiently arrange and process each of the requests. Generally, multitasking has positive connotations because of the improved efficiency associated with the ability to perform more than one process at one time.

However, multitasking has finite limitations because it is dependent on various factors such as the operating characteristics of the processor(s), memory, and I/O devices. For example, if a processor in a server is performing tasks for several clients, and the resources of that processor are being completely utilized, the processor can no longer multitask a new client request because of insufficient processor resources. Furthermore, a requested client task may be invalid preventing the server processor from effectively processing the task. In this situation the processor may continue to process the task without ever finishing because of the problem with the task, e.g., improper coding of the task resulting in an endless processing loop. A processor that is caught in an endless loop cannot be released to process other tasks. The processor may then simply crash and, in any case, needs to be restarted. In either case, the advantages of multitasking are not achieved.

SUMMARY OF THE INVENTION

A system for managing a plurality of client processes, comprising a client task within which the client processes will be executed and a manager task running at a higher priority than the client task, the manager task queuing the client processes into the client task in priority order, wherein the manager task kills the client task when a current one of the client processes is not completed within a predetermined time period.

DETAILED DESCRIPTION

Figure 1:
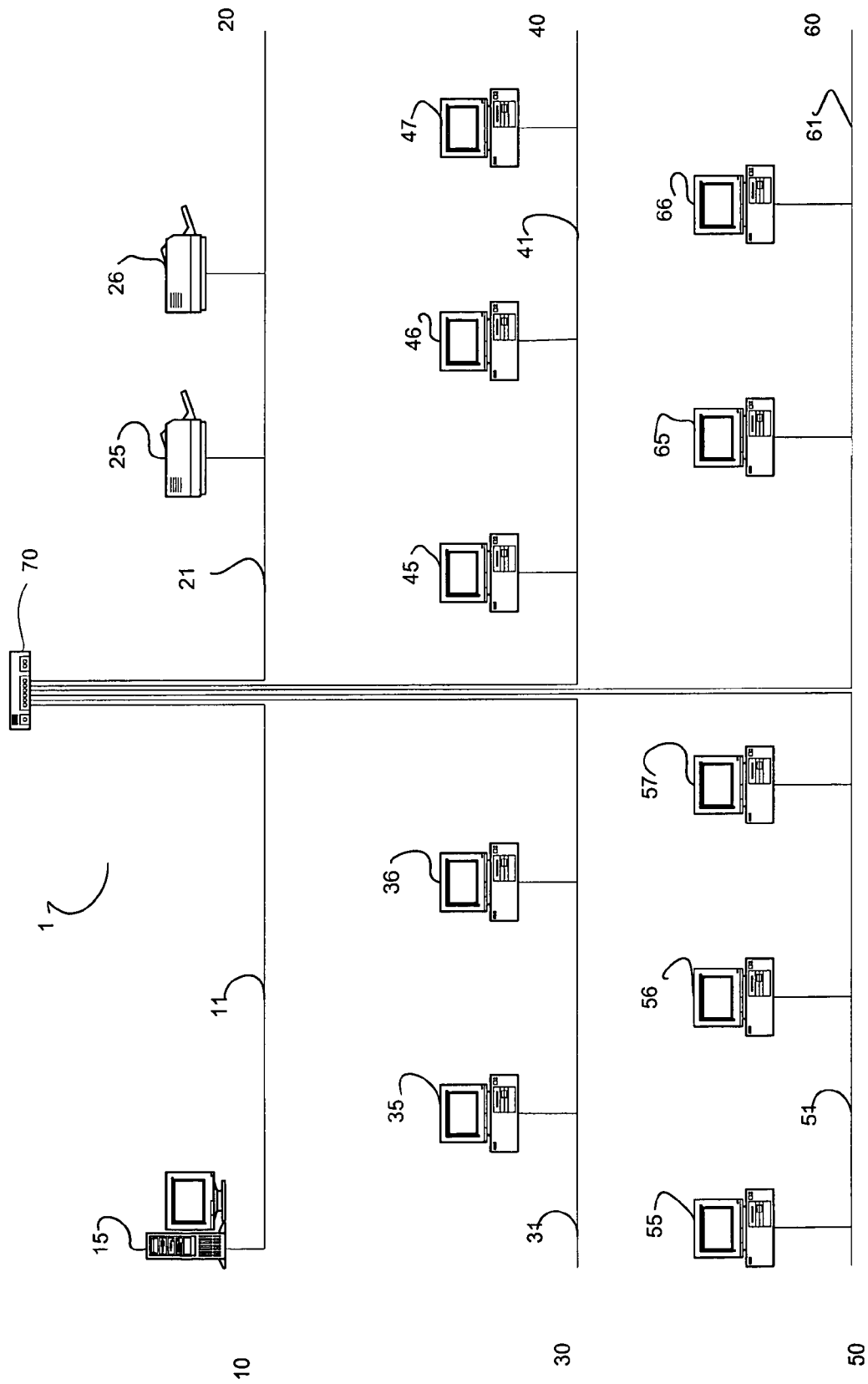
FIG. 1 shows an exemplary network on which the present invention may be implemented.

The present invention may be further understood with reference to the following description and the appended drawings, wherein like elements are provided with the same reference numerals. Initially referring to FIG. 1 there is illustrated an exemplary network 1 on which the present invention may be implemented. Network 1 includes six network segments 10-60 each of which has a network bus 11-61 to which various network devices are connected. Network segment 10 has server 15 connected to bus 11. Network segment 20 has printers 25-26 connected to bus 21. Network segment 30 has personal computers (PCs) 35-36 connected to bus 31. Similarly, network segments 40-60 have PCs connected to their buses. In the exemplary network 1 of FIG. 1, all of network segments 10-60 are linked via ports of network switch 70 allowing each of the network hardware devices to interconnect with any or all of the other hardware devices on any of network segments 10-60. In this exemplary embodiment of network 1, the network arrangement is that of a client-server relationship. Server 15 is the server and all the other hardware devices are clients. Server 15 may have functions which serve all the other hardware devices on the network, for example, file sharing, printer queues, etc. In such an arrangement, the processor or processors of server 15 may have to multitask to most efficiently use the resources of server 15 to serve the other hardware devices. Those skilled in the art will understand that network 1 is only one exemplary system on which the present invention may be implemented and that the present invention is applicable to any computing device where multiple processes or procedures may be run on a microprocessor. For example, the present invention may be implemented on any one of the PCs connected to network 1 of FIG. 1 or on a PC which is not connected to any network.

Figure 2:
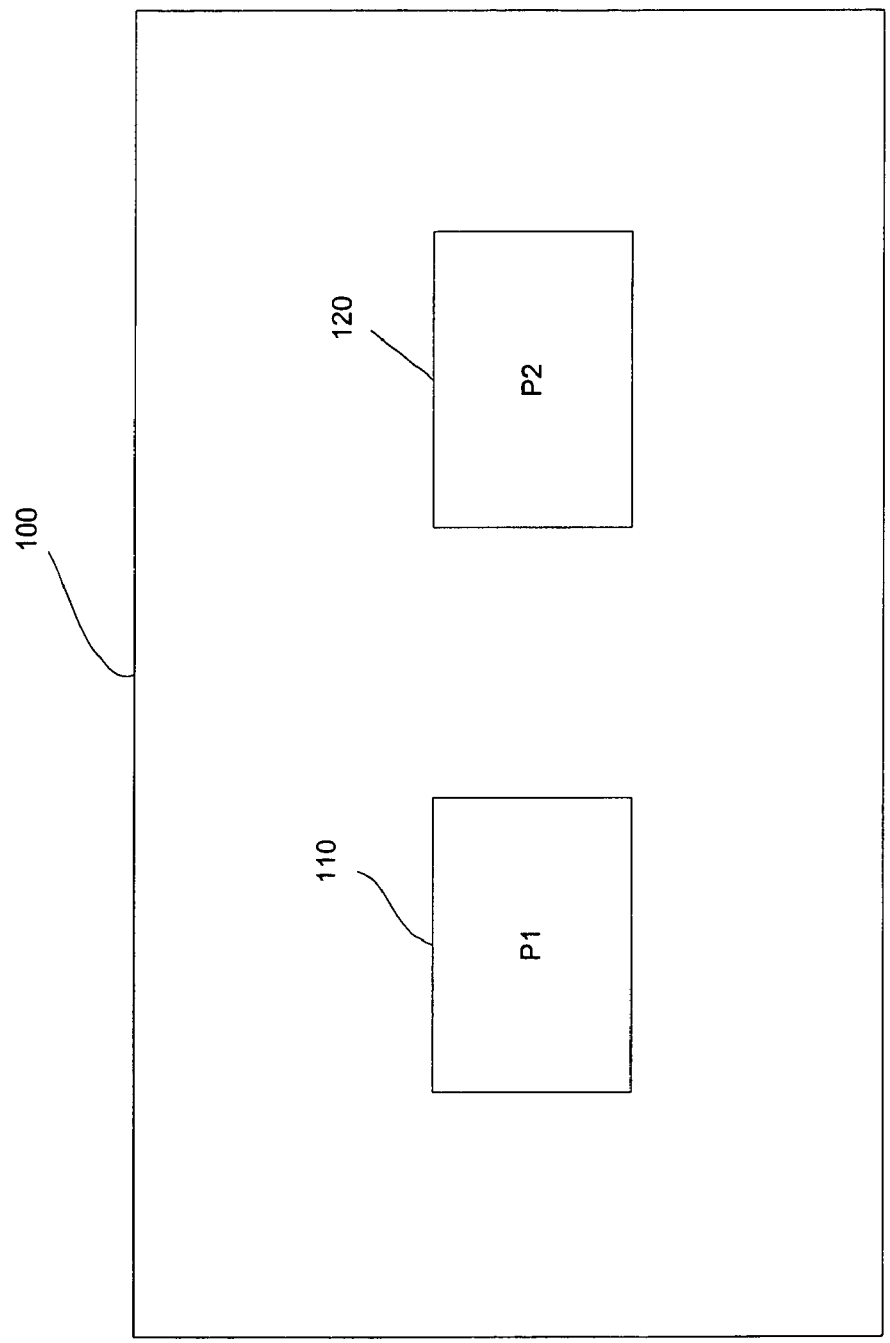
FIG. 2 shows an example of multiple processes being simultaneously run on a processor.

FIG. 2 shows an example of multiple processes 110 and 120 being simultaneously run on processor 100. In FIG. 2., process P1 110 and process P2 120 need to be executed by processor 100. In this example, process P1 110 has a higher priority than process P2 120, which means that when process P1 110 is ready to execute, processor 100 will execute process P1 110. Process P2 120 may be executing on processor 100 when process P1 110 is ready to execute, but since process P1 110 has a higher priority, it will preempt process P2 120. If for some reason, the execution of process P1 110 is interrupted for some reason (e.g., process P1 110 may need access to a system resource such as disk I/O that is presently unavailable to processor 100), process P2 120 may begin to be executed by processor 100. However, once process P1 110 is able to be executed, it will preempt the execution of process P2 120.

Figure 3:
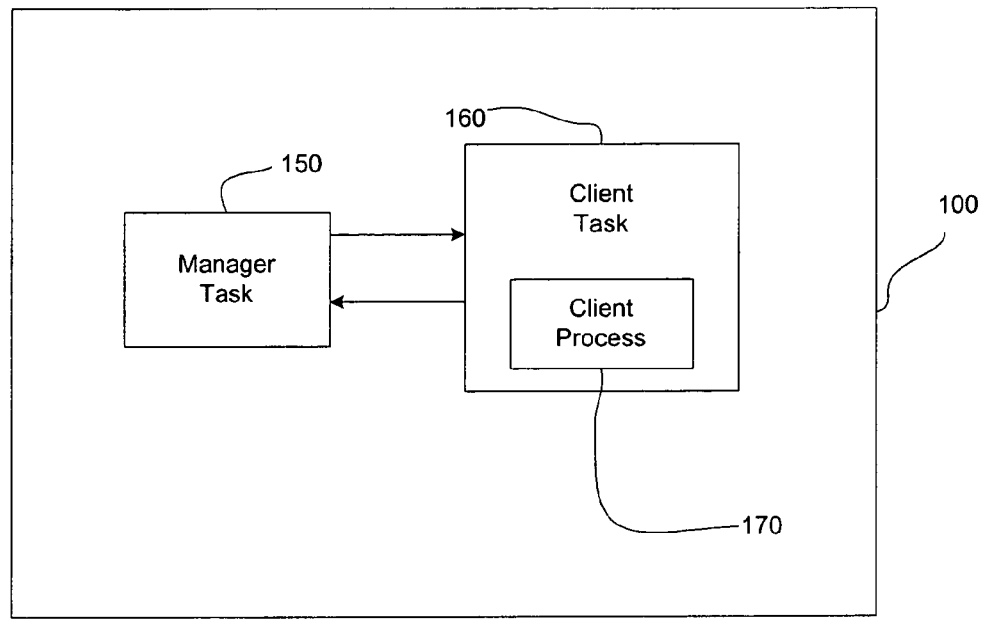
FIG. 3 shows an exemplary manager task and client task managing the execution of a client process on a processor according to the present invention

FIG. 3 shows an exemplary manager task 150 and client task 160 managing the execution of client process 170 on processor 100 according to the present invention. Client process 170 may be any process that needs to be executed by processor 100, for example, process P1 110 and process P2 120 FIG. 2. In this case, client process 170 is the actual process that processor 100 executes to accomplish a goal set by the user. The user may write software code in order that the computing device may accomplish different processes, for example, reading from or writing to a device, assembling a network protocol, etc. Client process 170 may execute within client task 160. It should be noted that a process and a task may be considered to be the same, i.e., lines of software code that may be executed by processor 100. In this description, the terms process and task are used to describe such lines of software code, but the term task (e.g., manager task 150 and client task 160) is used to define an element of the present invention that work in conjunction to manage the execution of user processes. Thus, the term process is used in this description to refer to any lines of software code that a user may desire to execute to accomplish a goal. These processes may be considered to be third party software code that is completely separate from the code that implements manager task 150 and client task 160. Additionally, manager task 150 and client task 160 are generic and may be used to manage the execution of any user processes. Since client task 160 is generic, client process 170 may be queued into client task 160 for execution by processor 100. The details of this process will be described in greater detail below.

As described above, manager task 150 and client task 160 will manage the execution of client process 170 on processor 100. Manager task 150 will execute as a higher priority process than client task 160. The reason for manager task 150 having a higher priority than client task 160 will be described in greater detail below. Manager task 150 and client task 160 may be considered processor management tools that prevent client process 170 from interfering with the execution of other client processes (not shown). As described above, an issue may arise if processor 100 cannot complete execution of client process 170. Processor 100 may end up in a continuous loop where it never completes executing client process 170, and therefore, other processes waiting to be executed by processor 100 may not be executed.

This is not an acceptable outcome in high availability applications where it is important that the system (e.g., the processor) be continuously available. In order for processor 100 to be continuously available, manager task 150 and client task 160 provide a mechanism to monitor client processes, for example, client process 170, to ensure that an errant client process does not deteriorate the availability of processor 100. Manager task 150 oversees the execution of client process 170 within client task 160 to ensure that such an issue does not arise in processor 100. As described above, both manager task 150 and client task 160 are generic and any client process may execute within the generic client task 160 and manager task 150 may oversee the execution of any client process. The basic interaction between manager task 150, client task 160 and client process 170 is that during the execution of client process 170, manager task 150 would expect a response from client task 160 to indicate that client process 170 is executing properly. This indication may be, for example, that client process 170 is complete, that client process 170 has output some intermediate value, etc. In the event that manager task 150 has not received the proper indication within a predetermined period of time, manager task 150 may kill the execution of client process 170 within processor 100 by restarting client task 160. Since client process 170 is queued within client task 170, this restart kills the execution of client process 170. Upon restart of client task 160, manager task 150 may then queue the next client process (not shown) into client task 160 so that it may be executed by processor 100.

Figure 4:
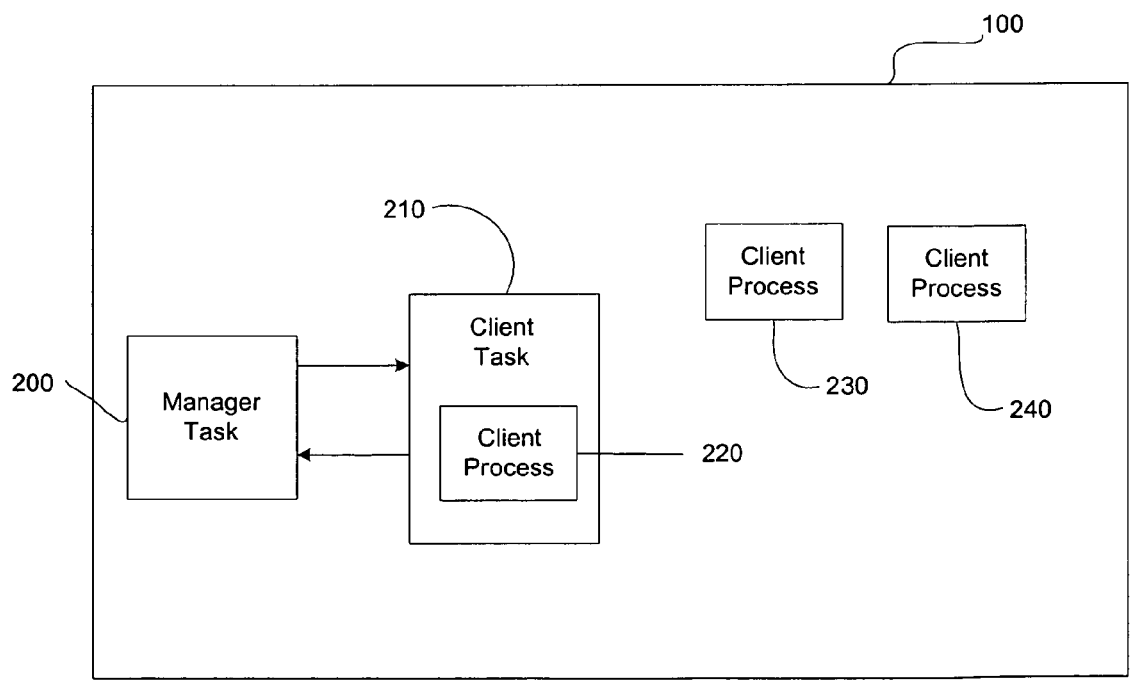
FIG. 4 shows an exemplary manager task and client task managing the execution of client processes in a processor according to the present invention.

FIG. 4 shows manager task 200 and client task 210 managing the execution of client processes 220-240 in processor 100 according to the present invention. If client process 220 is improperly coded, it may, for example, enter a continuous loop and therefore, client task 210 may not send a proper indication to manager task 200. In this case, manager task 200, because it is operating at a higher priority than client task 210 may instruct processor 100 to restart client task 210, thereby killing the execution of client process 220. When client task 210 is restarted it may be queued with a new client process, for example, client process 230, for execution by processor 100. In this case, client process 230 will then be executed by processor 100 and manager task 200 will expect an indication from client task 210 that client process 230 is operating correctly. When client process 230 is complete, client task 210 will indicate that client process 230 is complete to manager task 200 and the next client task 240 will be queued and executed within client task 210.

Figure 5:
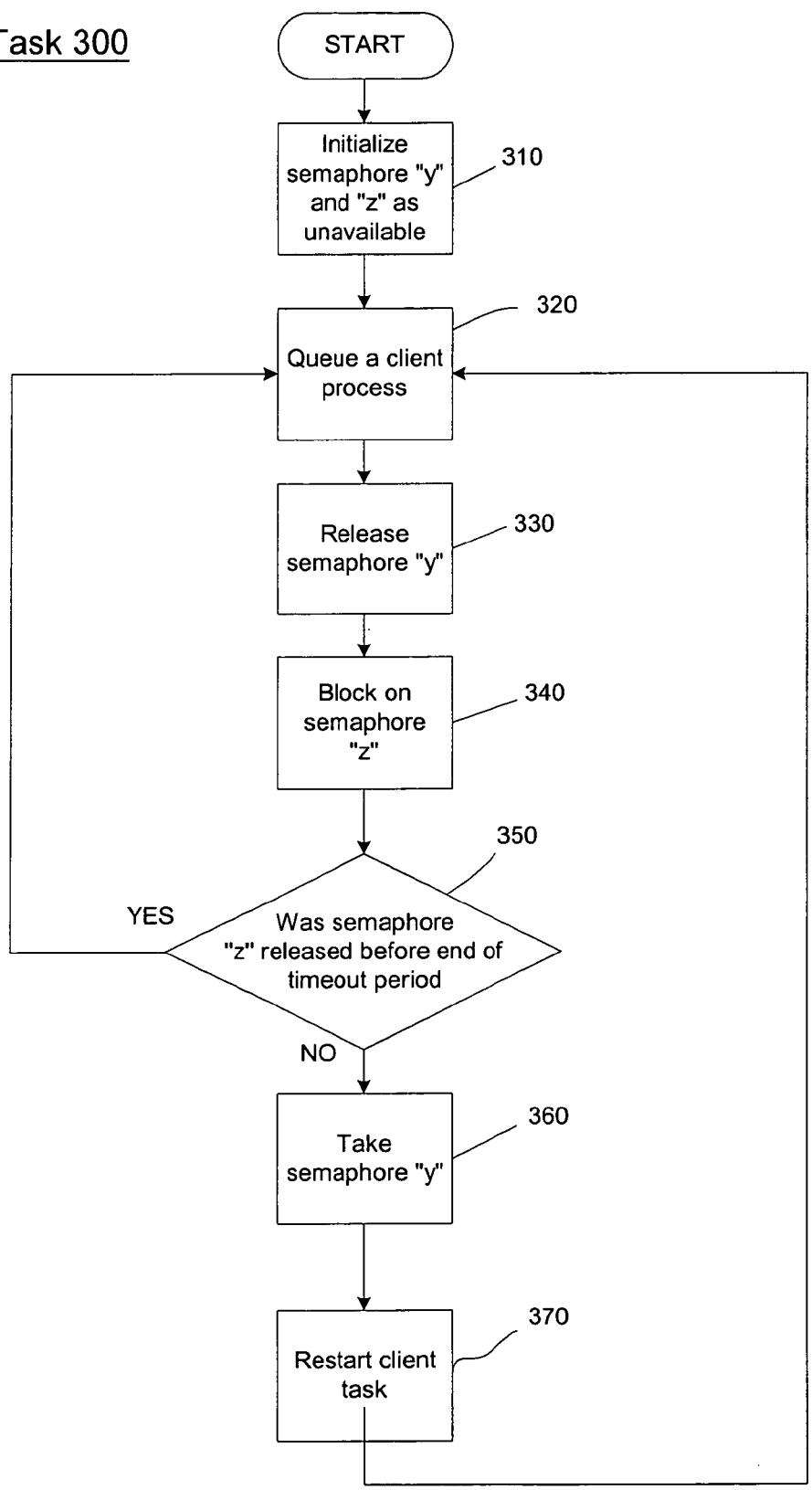
FIG. 5 shows an exemplary control process for the manager task according to the present invention

FIG. 5 shows an exemplary control process for manager task 300 according to the present invention. In step 310, manager process 300 initializes binary semaphores "y" and "z" as empty or not available. A semaphore is a hardware or software flag. In multitasking systems, a semaphore is a variable with a value that indicates the status of a common resource. It is used to lock the resource that is being used. A process needing the resource checks the semaphore to determine the status of the resource and then decides how to proceed. In this case, manager task 300, in step 310, has locked semaphores "y" and "z" so that any other process that needs these semaphores to execute cannot do so until they are released. The process then continues to step 320 where manager task queues a client process, for example, client process 220 in FIG. 4. The queuing of the client process moves it into the client task so that the client process may be executed by the processor. However, the client task is not ready to run and execute the client process at this time because it needs one of the semaphores in order to run. The process then continues to step 330 where manager task 300 releases semaphore "y" to the client task. Semaphore "y" is expected by the client task so that it may begin to run. An exemplary process for the client task will be described in greater detail below. After manager task 300 releases the semaphore "y" to the client task, the process continues to step 340 where manager task 300 blocks on semaphore "z" to allow the client task to run. Manager task 300 will block on semaphore "z" for a predetermined timeout period. As described above, manager task 300 is expecting some action by the client task within the predetermined timeout period. The consequences of this timeout period will be described in greater detail below with respect to step 350 of manager task 300. Continuing with step 340, to block means that the task is not schedulable or executable by the processor meaning that manager task 300 is no longer allowed to continue executing. The reason that manager task 300 must block is that since it is running at a higher priority than the client task, the client task cannot run because manager task 300 will preempt its execution. However, once manager task 300 is blocked, the client task may begin to execute. Before completing the process of manager task 300, this description will continue with an exemplary process for the client task because when manager task 300 is blocked the client task may begin to execute.

Figure 6:
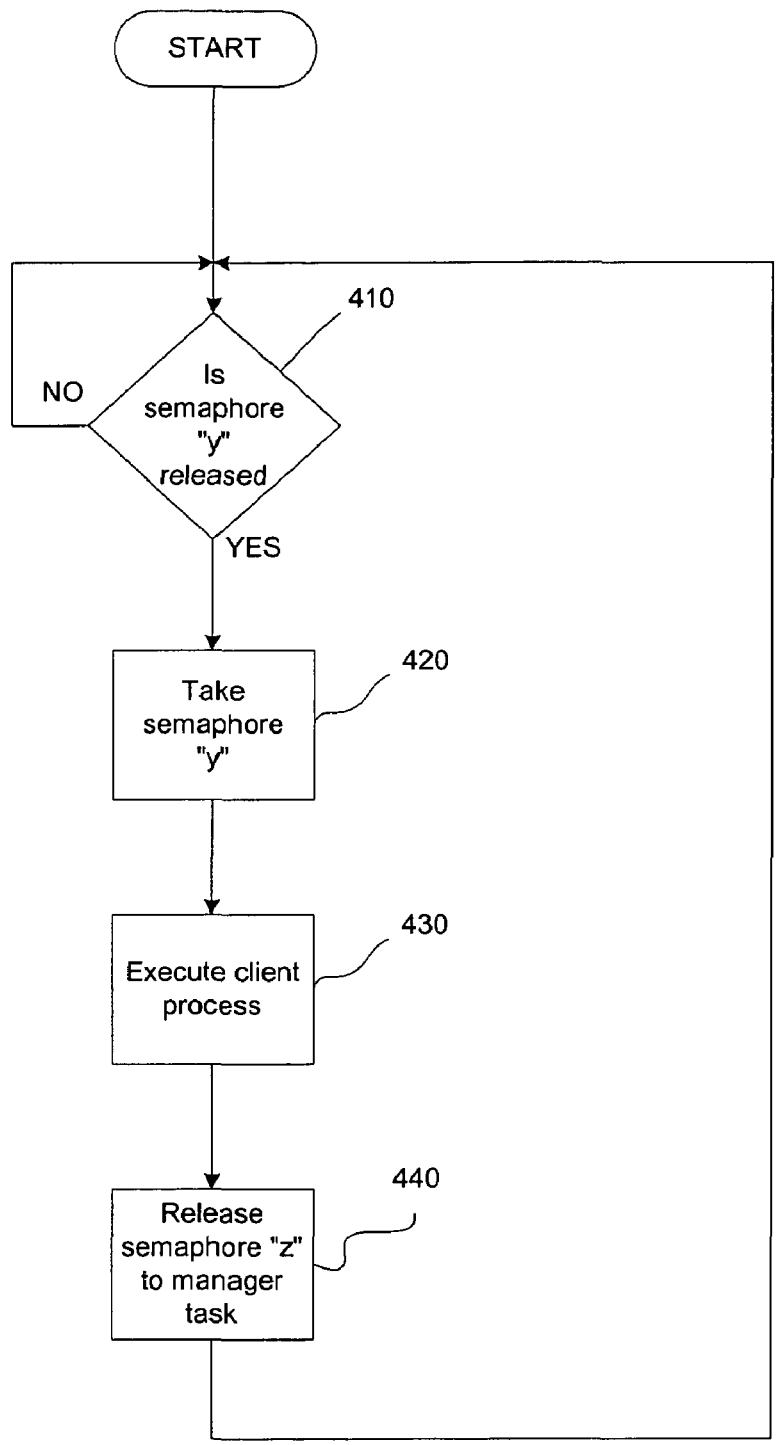
FIG. 6 shows an exemplary control process for the client task according to the present invention.

FIG. 6 shows an exemplary control process for client task 400 according to the present invention. In step 410, it is determined whether semaphore "y" has been released to client task 400. Until semaphore "y" is released, client task 400 cannot run because it is waiting for semaphore "y" to be set as usable by client task 400 so it can begin executing the client process. If semaphore "y" has not been released, the process continues to loop within step 410 until semaphore "y" is released. Those skilled in the art will understand that client task 400 is dependent upon access to semaphore "y" to run and that client task 400 will also not run until manager task 300 is blocked because manager task 300 has a higher priority than client task 400.

When semaphore "y" is available, client task 400 takes semaphore "y" in sep 420 and the process continues to step 430 where the client process is executed by the processor. The client process is queued by manager task 300 into client task 400 for execution by the processor. When the client process has been executed in step 430, the process continues to step 440 where the semaphore "z" is released to manager task 300. Semaphore "z" is the indication that manager task 300 is awaiting to ensure that the client process is running properly on the processor. This indication may be that the client process is complete or that the client process has given some intermediate output, etc. Those skilled in the art will understand that if client task 400 will be giving an indication of intermediate steps of the execution of a client process to manager task 300, it may be possible that more semaphores will be used to indicate further intermediate steps as well as completion of the execution of the process. For example, if client task 400 will be indicating to manager task 300 when a client process is at a midpoint and when it is complete, two semaphores may be used, or a single semaphore with two timeout periods may be used. Client task 400 may never complete the execution of the client process in step 430 because there is a problem with the client process, e.g., improper software coding by the user. In this case, client task 400 will remain in step 430 until it is restarted by manager task 300. If, client task 400 remains in step 430, it will not proceed to step 440 where semaphore "z" is released, and therefore, manager task 300 will not see the proper indication (e.g., the release of semaphore "z" within the timeout period) that the client process is executing correctly. In this case, client task 400 will be restarted by manager task 300 and the current client process will be killed. When client task 400 is in step 430 and it is restarted by manager task 300, it restarts at step 410. However, if the process completes execution of the client process in step 430 and semaphore "z" is released in a timely fashion in step 440, the process loops back to step 410 to await the release of semaphore "y" so that client task 400 may execute the next queued client process.

Referring back to FIG. 5 to continue with the exemplary process for manager task 300 at step 350 where it is determined whether semaphore "z" has been released by client task 400 before the timeout period has expired. Manager task 300 begins to execute on the processor again because it is only blocked until semaphore "z" is released or until the timeout period has expired. Since manager task 300 runs at a higher priority than client task 400, when the timeout period expires and manager task 300 is ready to run again, the processor will continue with the execution of manager task 300 by preempting the execution of client task 400. If semaphore "z" has been released within the timeout period, this means that the client process queued within client task 400 has been successfully executed. The process may then loop back to step 320 to queue the next client process that can be loaded into client task 400 to be executed by the processor. However, if semaphore "z" is not returned in a timely manner to manager task 300 in step 350, the process continues to step 360 where manager task 300 takes semaphore "y" and marks it as unavailable. This process is similar to the initialization of step 310 to make sure that any other tasks or processes that need semaphore "y" will be blocked. Manager task 300 then proceeds to step 370 where it restarts client task 400, thereby killing the currently executing client process. The process may then loop back to step 320 and the next client process may be loaded into client task 400 to be executed by the processor. When client task 400 is restarted in step 370, the client process that is causing the problem (e.g., a client process that is improperly coded resulting in the processor being in continuous loop and not allowing the client process to complete within the specified time period), is removed from the queue of client task 400. Thus, when client task 400 is restarted in step 370, there are no pending client processes in its queue, client task 400 is waiting for manager task 300 to queue up the next client process and release semaphore "y".

Referring back to FIG. 4, an alternative embodiment of the present invention will be described. In this alternative embodiment, if client process 220 that is currently being executed by processor 100 does not complete execution within the time period specified by manager task 200, client task 210 is still restarted, thereby killing client process 220 as described above. However, client process 220 is given at least one further chance to be executed by processor 100. When client task 210 is restarted by manager task 200, the unexecuted client process 220 is requeued by manager task 200. If client process 220 remains the highest priority client process, manager task 200 will move client process back into client task 210 so that processor 100 may begin to execute client process 220. If the problem that caused client process 220 to not be completed has been resolved, client process 220 will be completed and an indication of this completion will be sent to manager task 200. In the event that client process 220 again does not complete, manager task 200 may, once again, requeue client process 220 or it may queue the next client process, for example, client process 230, because client process 220 is damaged and may never execute properly. In the event that processor 100 unsuccessfully attempts to execute client process 220 several times, manager task 200 will not requeue client process 220 and then the next highest priority process, for example, client process 230, may be queued into client task 210 for execution by processor 100. The number of times that a client process can be retried may be settable by the user.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A system for managing a plurality of client processes, comprising:
   a client task within which the client processes will be executed; and
   a manager task running at a higher priority than the client task, the manager task queuing the client processes into the client task in priority order, wherein the manager task kills the client task when a current one of the client processes is not completed within a predetermined time period.

2. The system according to claim 1, wherein the manager task restarts the client task and queues a next one of the client processes into the client task.

3. The system according to claim 1, wherein the manager task restarts the client task and requeues the current client process into the client task.

4. The system according to claim 1, wherein the client task sends a response to the manager task indicating the execution of the current client process is complete.

5. The system according to claim 4, wherein the manager task, when receiving the response from the client task, queues a next one of the client processes into the client task.

6. A method for managing a plurality of client processes, comprising the steps of:
 queuing a first one of the client processes into a client task, wherein the first client process is executed within the client task; and
 killing execution of the client task by a manager task executing at a priority higher than that of the client task when the first client process is not completed within a predetermined time period.

7. The method according to claim 6, further comprising the step of:
 releasing a first semaphore by the manager task, wherein the client task does not execute until the first semaphore is released by the manager task.

8. The method according to claim 7, further comprising the step of:
 releasing a second semaphore by the client task indicating the execution of the first client process is complete.

9. The method according to claim 6, further comprising the steps of:
 restarting the client task by the manager task; and
 queuing a second one of the client processes into the client task.

10. The method according to claim 6, further comprising the steps of:
 restarting the client task by the manager task; and
 requeuing the first client process into the client task.

11. A computer-readable storage medium storing a set of instructions, the set of instructions capable of being executed by a processor to manage a plurality of client processes, the set of instructions performing the steps of:
 queuing a first one of the client processes into a client task, wherein the first client process is executed within the client task; and
 killing execution of the client task by a manager task executing at a priority higher than that of the client task when the first client process is not completed within a predetermined time period.

* * * * *